C. A. XARDELL.
TANK.
APPLICATION FILED MAR. 24, 1919.

1,310,517. Patented July 22, 1919.

Inventor:
Charles A. Xardell,
by Calver & Calver,
Attys.

UNITED STATES PATENT OFFICE.

CHARLES A. XARDELL, OF UTICA, NEW YORK.

TANK.

1,310,517. Specification of Letters Patent. Patented July 22, 1919.

Application filed March 24, 1919. Serial No. 284,766.

*To all whom it may concern:*

Be it known that I, CHARLES A. XARDELL, a citizen of the United States, residing at Utica, in the county of Oneida and State of New York, have invented or discovered certain new and useful Improvements in Tanks, of which the following is a specification, reference being had therein to the accompanying drawing.

This invention relates to a baffle or splash plate to be placed in the interior of a gasolene or other fluid tank to check the swash of the liquid from one end of the tank to the other. This has heretofore been accomplished by providing the tanks with partitions having openings and which partitions were soldered or riveted to the sides of the tanks. Gasolene tanks that are exposed to view at the rear of cars are usually given a high finish, and when the splash plates are riveted or soldered to the main body or sides of the tank the finish is marred by the rivets as also by the heat in soldering the partitions or splash plates in place, so that after the tanks are highly varnished the finish is more or less marred or unsightly.

The present invention has for its object to provide a baffle or splash plate for a gasolene tank or the like and which is riveted or otherwise suitably attached to the bottom of the tank where the rivets will not be exposed to view, leaving the rest of the tank smooth for fine finishing. To this end the improved baffle or splash plate has two inclined walls forming two inclined partitions, said plate being preferably riveted at its bottom to the bottom of the tank and fitting loosely between the side walls of the tank, so that the liquid in the tank may maintain a proper level throughout the tank.

Figure 1:
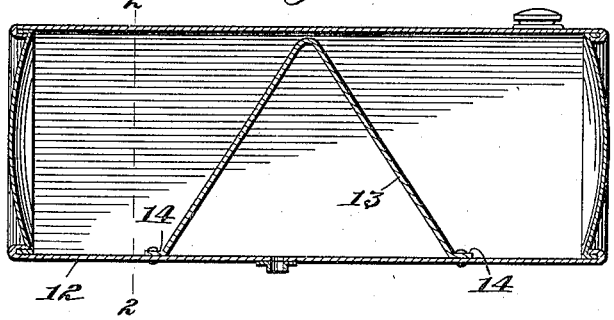
Figure 2:
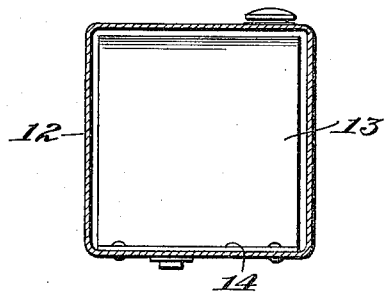
Figure 3:
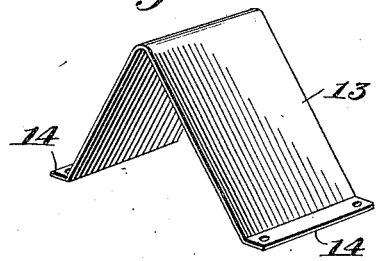

In the accompanying drawing Figure 1 is a longitudinal section of the improved tank and Fig. 2 is a transverse section thereof on line 2—2, Fig. 1. Fig. 3 is a detail perspective view of the improved baffle or splash plate.

Referring to the drawing, 12 denotes the body of the tank which may be of any suitable shape in cross section, but which is shown as being of rectangular form. Riveted or otherwise suitably attached to the bottom of the tank is the baffle or splash plate 13 which consists of a single piece of metal bent at its middle portion to form two slanting walls or partitions which are preferably provided at their bottoms with out-turned flanges 14 by which the improved baffle or splash plate is riveted or otherwise suitably secured to the bottom of the tank.

The baffle or splash plate 13 is arranged near the middle or central portion of the tank, and is disposed crosswise thereof, so that it will check the swash of the liquid from one end of the tank to the other. As the said baffle or splash plate fits loosely between the side walls of the tank the liquid will readily find its own level in all portions of the tank.

While it is preferred to form the improved baffle or splash plate in two slanting parts attached at their lower ends to the bottom of the tank, and fitting loosely between the side walls thereof, the invention may be considered to comprise any form of baffle or splash plate which is attached only at its bottom to the bottom of a closed tank.

Having thus described my invention I claim and desire to secure by Letters Patent:

1. A closed tank, for holding gasolene or other liquid, provided with an interior baffle or splash plate disposed crosswise of said tank near the middle portion thereof, and fitting loosely between the side walls thereof, said baffle or splash plate comprising two slanting walls or parts secured at their lower ends to the bottom of said tank.

2. A closed tank, for holding gasolene or other liquid, provided with an interior baffle or splash plate disposed crosswise of said tank near the middle portion thereof, and fitting loosely between the side walls thereof, said baffle or splash plate comprising two slanting walls or parts having out-turned flanges at their lower ends by which they are secured to the bottom of said tank.

In testimony whereof I affix my signature.

CHARLES A. XARDELL.

Copies of this patent may be obtained for five cents each, by addressing the "Commissioner of Patents, Washington, D. C."